(12) United States Patent
Tanaka et al.

(10) Patent No.: US 10,718,287 B2
(45) Date of Patent: Jul. 21, 2020

(54) INJECTION CONTROL DEVICE

(71) Applicant: DENSO CORPORATION, Kariya, Aichi-pref. (JP)

(72) Inventors: Makoto Tanaka, Kariya (JP); Syohei Fujita, Kariya (JP)

(73) Assignee: DENSO CORPORATION, Kariya (JP)

( * ) Notice: Subject to any disclaimer, the term of this patent is extended or adjusted under 35 U.S.C. 154(b) by 147 days.

(21) Appl. No.: 15/751,272

(22) PCT Filed: Aug. 25, 2016

(86) PCT No.: PCT/JP2016/074730
§ 371 (c)(1),
(2) Date: Feb. 8, 2018

(87) PCT Pub. No.: WO2017/051652
PCT Pub. Date: Mar. 30, 2017

(65) Prior Publication Data
US 2018/0230924 A1   Aug. 16, 2018

(30) Foreign Application Priority Data

Sep. 24, 2015 (JP) .................................. 2015-187166

(51) Int. Cl.
*F02D 41/20* (2006.01)
*F02M 51/00* (2006.01)
(Continued)

(52) U.S. Cl.
CPC ............. *F02D 41/20* (2013.01); *F02D 41/34* (2013.01); *F02D 41/36* (2013.01); *F02D 41/40* (2013.01);
(Continued)

(58) Field of Classification Search
CPC .......... F02D 41/20; F02D 41/34; F02D 41/40; F02D 2041/2055; F02D 2041/2058;
(Continued)

(56) References Cited

U.S. PATENT DOCUMENTS

2003/0071613 A1* 4/2003 Schultz ................. H01F 7/1844
324/207.16
2007/0041131 A1* 2/2007 Kesselgruber ....... G01D 5/2013
360/256.2
(Continued)

FOREIGN PATENT DOCUMENTS

EP     2 443 333     10/2014
JP    2001-221121    8/2001
(Continued)

*Primary Examiner* — Phutthiwat Wongwian
*Assistant Examiner* — Arnold Castro
(74) *Attorney, Agent, or Firm* — Nixon & Vanderhye, P.C.

(57) ABSTRACT

An injection control device controls a fuel injection valve driven by an electric power. The injection control device includes a current detection unit to detect a driving current supplied to a solenoid of the fuel injection valve, an identification unit to identify a theoretical model of the driving current in a state where a movable core moved by an electromagnetic force generated by the solenoid is at rest, and a state detection unit to detect a state of the movable core. The state detection unit detects the state of the movable core, based on a deviation between the driving current detected by the current detection unit and the theoretical model.

18 Claims, 8 Drawing Sheets

(51) Int. Cl.

| | |
|---|---|
| *F02M 61/10* | (2006.01) |
| *F02M 51/06* | (2006.01) |
| *F02D 41/40* | (2006.01) |
| *F02D 41/34* | (2006.01) |
| *F02D 41/36* | (2006.01) |
| *F02D 45/00* | (2006.01) |
| *F02D 41/14* | (2006.01) |
| *F16K 31/06* | (2006.01) |

(52) U.S. Cl.
CPC ............ *F02D 45/00* (2013.01); *F02M 51/00* (2013.01); *F02M 51/06* (2013.01); *F02M 51/061* (2013.01); *F02M 51/0675* (2013.01); *F02M 61/10* (2013.01); *F02D 2041/1433* (2013.01); *F02D 2041/2055* (2013.01); *F02D 2041/2058* (2013.01); *F02D 2200/0618* (2013.01); *F16K 31/0627* (2013.01); *Y02T 10/44* (2013.01)

(58) Field of Classification Search
CPC ...... F02M 51/00; F02M 51/06; F02M 51/061; F16K 31/0627
See application file for complete search history.

(56) References Cited

U.S. PATENT DOCUMENTS

| | | | |
|---|---|---|---|
| 2007/0139047 A1* | 6/2007 | Ostman | ................... F02D 41/20 324/418 |
| 2011/0273812 A1 | 11/2011 | Beer et al. | |
| 2014/0069389 A1 | 3/2014 | Nishimura | |
| 2015/0226148 A1* | 8/2015 | Beer | ..................... F02D 41/247 123/480 |

FOREIGN PATENT DOCUMENTS

| | | |
|---|---|---|
| JP | 2014-055570 | 3/2014 |
| WO | WO 2010/145936 | 12/2010 |

* cited by examiner

INJECTION CONTROL DEVICE

CROSS REFERENCE TO RELATED APPLICATION

This application is the U.S. national phase of International Application No. PCT/JP2016/074730 filed on Aug. 25, 2016, which designated the U.S. and claims priority to Japanese Patent Application No. 2015-187166 filed on Sep. 24, 2015, the entire contents of each of which are incorporated herein by reference.

TECHNICAL FIELD

The present disclosure relates to an injection control device that controls a fuel injection valve driven by an electric power.

BACKGROUND ART

An internal combustion engine is provided with a fuel injection valve injecting fuel in each cylinder. A general fuel injection valve has a solenoid and a movable core. The fuel injection valve is opened or closed as a valve body inside the fuel injection valve moves integrally with the movable core.

The injection control device controls the fuel injection valve such that the amount of fuel injected from the fuel injection valve (that is, the amount of fuel injected during a period from opening of the fuel injection valve to closing thereof) matches a target value. Specifically, the injection control device adjusts the duration, magnitude, and the like of a driving current supplied to the fuel injection valve to adjust the valve opening time of the fuel injection valve and match the amount of fuel injected with the target value.

When a plurality of fuel injection valves is provided in the internal combustion engine, the amount of fuel injected from each fuel injection valve may vary due to individual differences and deterioration of the fuel injection valves, the ambient temperature, and the like. It is thus necessary to adjust the duration and the like for supplying the driving current and reduce the variations in the amount of fuel injected from the fuel injection valves. In order to control the actual amount of fuel injected, the start and end of the movement of the valve body need to be detected in a valve opening operation of the fuel injection valve.

A control device described in Patent Literature 1 detects the start of the movement of a valve body on the basis of a change in a driving current supplied to a fuel injection valve. Specifically, a movement of a movable core together with the valve body causes a change in inductance and thus a change in the driving current. The control device described in Patent Literature 1 differentiates the driving current with respect to time and detects the start of the movement of the movable core on the basis of the differential value.

PRIOR ART LITERATURES

Patent Literature

Patent Literature 1: WO2010/145936 A

SUMMARY OF INVENTION

Noise may be generated due to various factors in the driving current supplied to the fuel injection valve. For this reason, a device using the value obtained by differentiating the driving current with respect to time, such as the control device described in Patent Literature 1 is possibly affected to a large extent by the noise. As a result, it has been difficult to accurately detect the state of the movable core in the fuel injection valve.

The control device described in Patent Literature 1 may not be able to accurately detect the state of the movable core either when the control device is applied to a fuel injection valve with a specification in which a movement of the movable core causes a small change in inductance.

It is an object of the present disclosure to provide an injection control device that is less susceptible to noise and capable of accurately detecting the state of a movable core even when the device is applied to a fuel injection valve with a small change in inductance.

According to an aspect of the present disclosure, the injection control device controls a fuel injection valve driven by an electric power. The injection control device includes a current detection unit to detect a driving current supplied to a solenoid of the fuel injection valve, an identification unit to identify a theoretical model of the driving current in a state where a movable core moved by an electromagnetic force generated by the solenoid is at rest, and a state detection unit to detect a state of the movable core. The state detection unit detects the state of the movable core, based on a deviation between the driving current detected by the current detection unit and the theoretical model.

The theoretical model of the driving current is a model of the driving current in a state where the movable core is at rest. According to the injection control device of the present disclosure, the state of the movable core is detected based on the deviation between an actual driving current detected by the current detection unit and the theoretical model. The injection control device can thus be less susceptible to noise generated in the driving current as compared with the case where the state of the movable core is detected based on a value obtained by differentiating the driving current with respect to time. The injection control device can also detect the state of the movable core accurately even when the injection control device is applied to the fuel injection valve with a small change in inductance.

BRIEF DESCRIPTION OF DRAWINGS

The above and other objects, features and advantages of the present disclosure will become more apparent from the following detailed description made with reference to the accompanying drawings. In the drawings:

FIG. 5 is a graph illustrating a change in a driving current supplied to the fuel injection valve of FIG. 1 and the like;

DESCRIPTION OF EMBODIMENTS

Embodiments of the present disclosure will be described hereafter referring to drawings. In the embodiments, a part that corresponds to a matter described in a preceding embodiment may be assigned with the same reference numeral, and redundant explanation for the part may be omitted.

Figure 1:
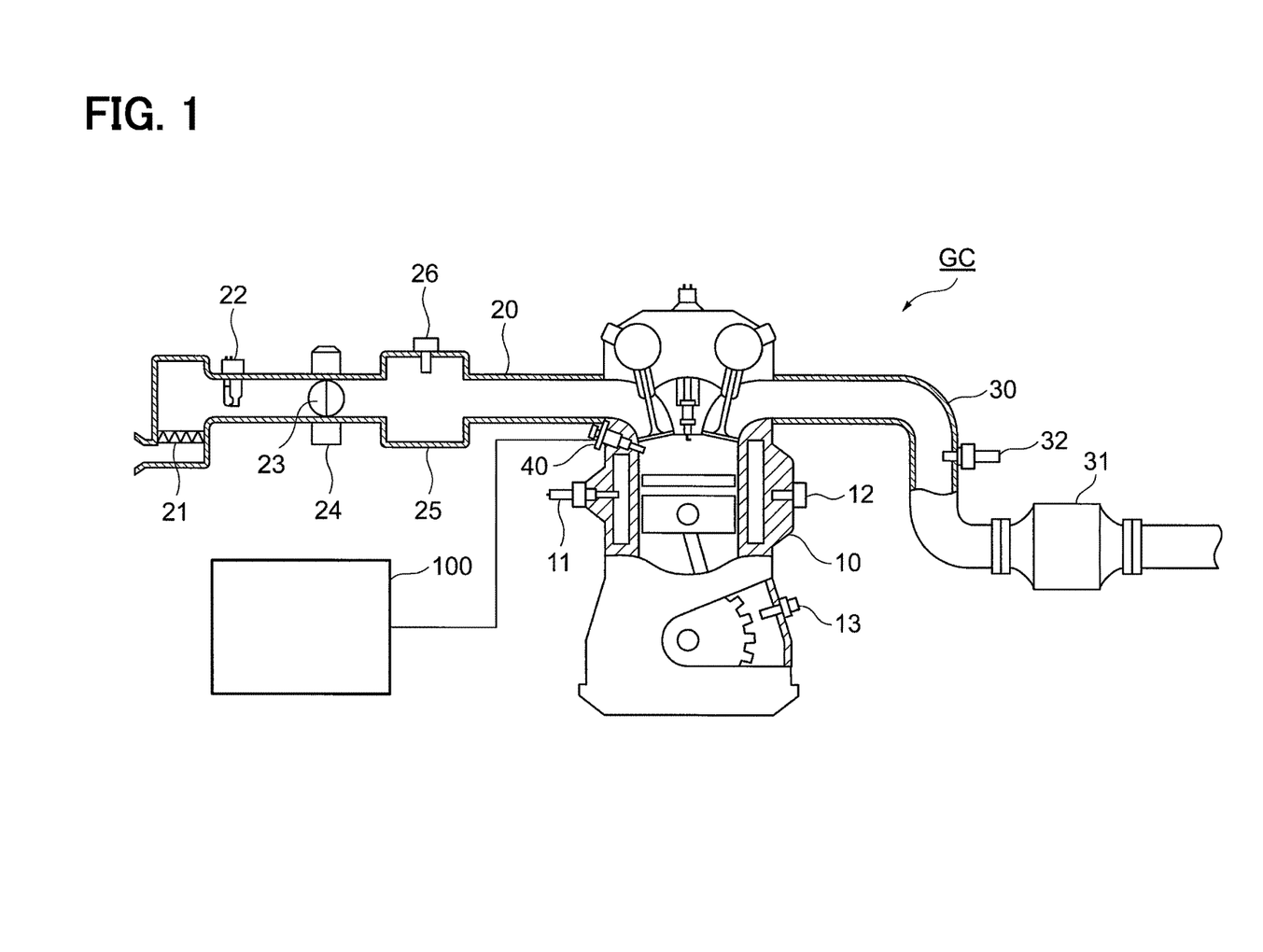
FIG. 1 is a schematic diagram illustrating the configuration of an injection control device according to an embodiment and a vehicle equipped with the injection control device.

An injection control device 100 according to an embodiment will be described with reference to FIG. 1. The injection control device 100 is mounted in a vehicle GC equipped with an internal combustion engine 10. The injection control device 100 is a device that controls a fuel injection valve 40 provided in the internal combustion engine 10.

The structure of the vehicle GC will be described first. The vehicle GC includes the internal combustion engine 10, an intake pipe 20, and an exhaust pipe 30.

The internal combustion engine 10 is a gasoline-fueled reciprocating engine, for example. The internal combustion engine 10 has a plurality of cylinders. The cylinders receive the supply of liquid fuel thereinto and generate torque by repeating each of an intake stroke, a compression stroke, a combustion stroke, and an exhaust stroke. The torque is output via a crankshaft (not shown) of the internal combustion engine 10 and used for traveling of the vehicle GC. Note that only a single cylinder is illustrated in FIG. 1 in the internal combustion engine 10 as the cylinders have substantially the same structure.

Various sensors such as a coolant temperature sensor 11, a knock sensor 12, and a crank angle sensor 13 are attached to each cylinder of the internal combustion engine 10. The coolant temperature sensor 11 is a sensor that detects the temperature of a coolant circulating between a radiator (not shown) and the internal combustion engine 10. The knock sensor 12 is a sensor that detects knocking which is abnormal combustion that occurs inside the cylinder of the internal combustion engine 10. The crank angle sensor 13 is a sensor that detects the angle of rotation of the crankshaft of the cylinder. Each of the various sensors generates a signal responsive to the value detected thereby and transmits the signal to the outside.

The internal combustion engine 10 is provided with a plurality of the fuel injection valves 40. The fuel injection valve 40 is also called an injector and is an electromagnetic valve that injects fuel into each cylinder of the internal combustion engine 10. Fuel pressurized by a fuel pump (not shown) is supplied to the fuel injection valve 40. When the fuel injection valve 40 opens, the fuel injected from the tip of the fuel injection valve is mixed with air and supplied into the cylinder. The injection control device 100 controls opening and closing operations of the fuel injection valve 40 to adjust timing of supplying fuel to the internal combustion engine 10 and the amount of the fuel.

The intake pipe 20 is a pipe supplying air to the internal combustion engine 10. The intake pipe 20 is provided with an air cleaner 21, an air flow meter 22, a throttle valve 23, and a surge tank 25 in order from the upstream side. The internal combustion engine 10 is connected to a downstream end of the intake pipe 20.

The air cleaner 21 is a filter that removes foreign matter in the air. The air cleaner 21 removes foreign matter from the air that is supplied from the outside to the internal combustion engine 10 through the intake pipe 20. The air flow meter 22 is a flow meter that detects the flow rate of the air. The air flow meter 22 detects the flow rate of the air flowing through the intake pipe 20 and supplied to the internal combustion engine 10. The air flow meter 22 generates a signal responsive to the flow rate of the air being detected and transmits the signal to the outside.

The throttle valve 23 is a valve that adjusts the flow rate. When an occupant of the vehicle GC operates an accelerator pedal (not shown), the opening of the throttle valve 23 is adjusted on the basis of how much the pedal is operated. The flow rate of the air flowing through the intake pipe 20 and supplied to the internal combustion engine 10 is adjusted by the adjustment on the opening of the throttle valve 23. The throttle valve 23 is provided with an opening sensor 24. The opening sensor 24 detects the opening of the throttle valve 23, generates a signal responsive to the opening, and transmits the signal to the outside.

The surge tank 25 is a container formed in the middle of the intake pipe 20. The intake pipe 20 branches into a plurality of parts downstream of the surge tank 25. The branched parts of the intake pipe 20 are connected to the cylinders of the internal combustion engine 10. The internal volume of the surge tank 25 is larger than that of the other parts of the intake pipe 20. The surge tank 25 is formed in the intake pipe 20 to be able to prevent a pressure change in one of the cylinders from affecting the other cylinders. A pressure sensor 26 is provided in the surge tank 25. The pressure sensor 26 detects the pressure inside the intake pipe 20, generates a signal responsive to the pressure, and transmits the signal to the outside.

The exhaust pipe 30 is a pipe that discharges to the outside the gas generated in the combustion stroke of each cylinder of the internal combustion engine 10. The internal combustion engine 10 is connected to an upstream end of the exhaust pipe 30. A catalytic converter 31 that purifies the gas is provided in the middle of the exhaust pipe 30.

An air-fuel ratio sensor 32 is provided upstream of the catalytic converter 31 on the exhaust pipe 30. The air-fuel ratio sensor 32 is a sensor that detects oxygen concentration of the gas flowing through the exhaust pipe 30. The air-fuel ratio sensor 32 generates a signal responsive to the detected oxygen concentration and transmits the signal to the outside. In order for the internal combustion engine 10 to perform combustion at a stoichiometric air-fuel ratio, the injection control device 100 controls the amount of fuel injected from the fuel injection valve 40 (that is, the amount of fuel injected during a period from opening of the fuel injection valve 40 to closing thereof) on the basis of the concentration detected by the air-fuel ratio sensor 32 and the like.

Figure 2:
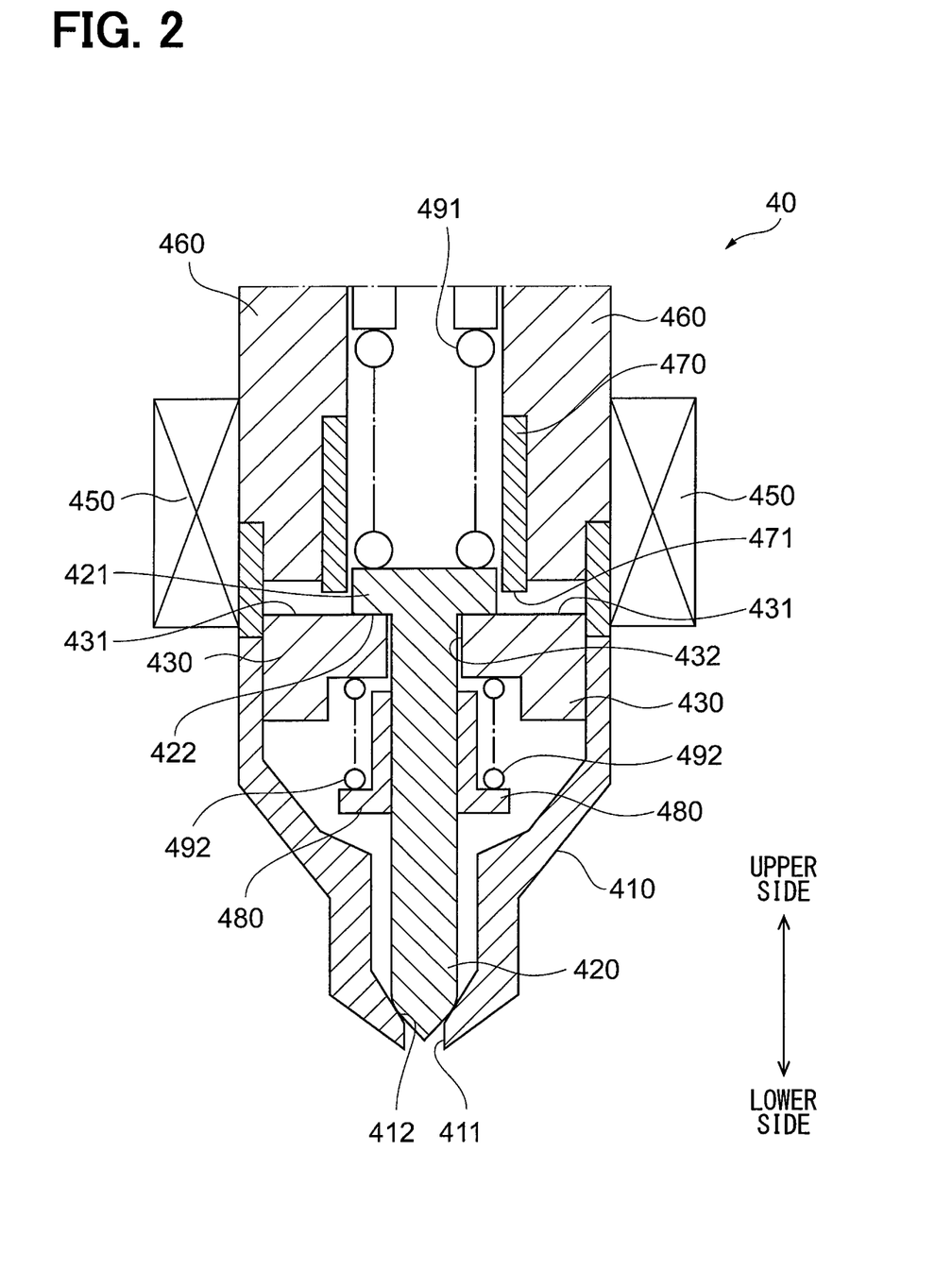
FIG. 2 is a schematic diagram illustrating a fuel injection valve of FIG. 1 when the valve is closed.
Figure 3:
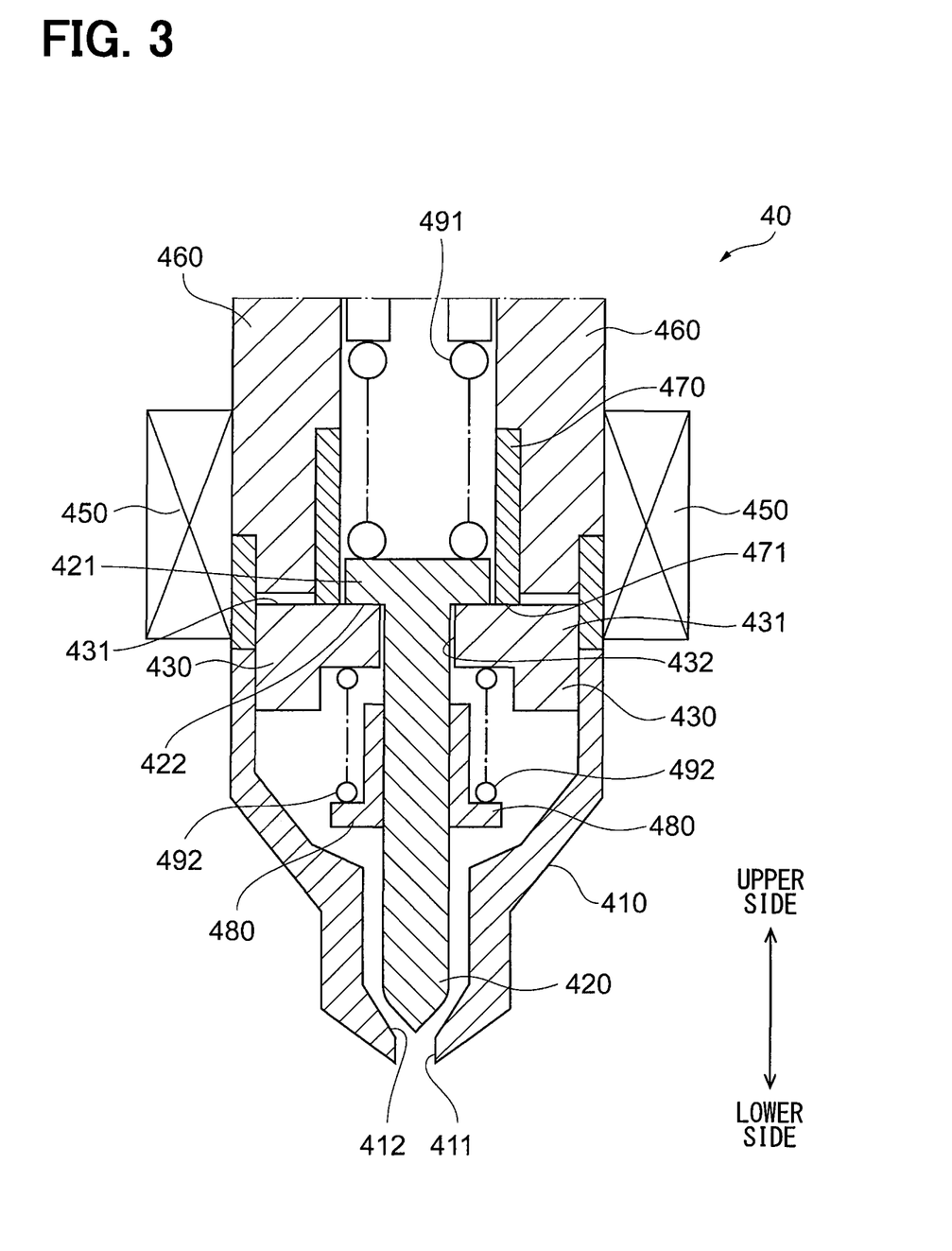
FIG. 3 is a schematic diagram illustrating the fuel injection valve of FIG. 1 when the valve is open.

Specific structure and operation of the fuel injection valve 40 will be described with reference to FIGS. 2 and 3. FIG. 2 illustrates the internal structure of the fuel injection valve 40 when the valve is closed. FIG. 3 illustrates the internal structure of the fuel injection valve 40 when the valve is open. The fuel injection valve 40 houses a valve body 420, a movable core 430, and the like inside a case 410 formed as a cylindrical container. An injection port 411 as an outlet for fuel is formed at the tip of the case 410. A valve seat 412 is formed on the inner wall surface of the case 410 and around the injection port 411.

The valve body 420 is disposed to be movable along an axial direction being a longitudinal direction of the case 410. When the valve body 420 is positioned on the lowermost side as illustrated in FIG. 2, a lower end of the valve body 420 is in contact with the valve seat 412 so that the injection port 411 is closed. Fuel is not injected from the injection port 411 in this case. When the valve body 420 moves upward with an upward movement of the movable core 430, the lower end of the valve body 420 is separated from the valve seat 412. Fuel is injected from the injection port 411 as a result. The further the valve body 420 is separated from the valve seat 412, the greater the flow rate of fuel injected from the injection port 411 per unit time. In other words, the opening of the fuel injection valve 40 increases as the valve body 420 moves upward.

The valve body 420 has a substantially cylindrical shape as a whole. The valve body 420 is disposed so as to be inserted through a through hole 432 formed in the center of the movable core 430. An enlarged diameter part 421 having a larger diameter than another part is formed in the vicinity of an upper end of the valve body 420. A lower surface 422 that is a lower end surface of the enlarged diameter part 421 is in contact with an upper surface 431 that is an upper end surface of the movable core 430.

A cylindrical body 480 is fixed to a part of the side surface of the valve body 420 below the movable core 430. A lower part of the cylindrical body 480 protrudes outward. A spring 492 is disposed between the protruding part and the movable core 430. The spring 492 is disposed in a compressed state so that the movable core 430 receives an upward force from the spring 492. The valve body 420 thus receives an upward force as well since the lower surface 422 thereof is in contact with the upper surface 431 of the movable core 430.

The movable core 430 is a member made of magnetic material such as ferritic stainless steel, for example. The movable core 430 has a substantially cylindrical shape. The through hole 432 is formed in the center of the movable core 430 as described above. The valve body 420 is inserted through the through hole 432. The outer diameter of the movable core 430 is substantially equal to the inner diameter of the case 410. The movable core 430 is disposed to be movable in the longitudinal direction of the case 410.

A spring 491 is disposed on the enlarged diameter part 421 of the valve body 420. The spring 491 is disposed in a compressed state. The valve body 420 thus receives a downward force from the spring 491.

A fixed core 460 is disposed above the movable core 430. The fixed core 460 is a member having a substantially cylindrical shape and made of magnetic material such as ferritic stainless steel, for example. The fixed core 460 is fixed to the case 410. A gap is formed between the fixed core 460 and the movable core 430.

A bushing 470 is fixed to the inner peripheral side of the fixed core 460. The bushing 470 has a substantially cylindrical shape. A part of the enlarged diameter part 421 of the valve body 420 is disposed inside the bushing 470. A lower end surface 471 that is a lower end surface of the bushing 470 is positioned further below a lower end of the fixed core 460. When the fuel injection valve 40 is closed as illustrated in FIG. 2, the lower end surface 471 of the bushing 470 and the upper surface 431 of the movable core 430 are separated from each other.

A solenoid 450 is disposed on the outer peripheral side of the fixed core 460. The injection control device 100 supplies electric power output from a battery (not shown) to the solenoid 450. In the following description, a current supplied to operate the fuel injection valve 40 is referred to as a driving current. When the driving current flows through the solenoid 450, a magnetic circuit is formed in the movable core 430, the fixed core 460, and the case 410. An electromagnetic force is generated as a result between the movable core 430 and the fixed core 460, whereby the movable core 430 receives an upward force.

The fuel injection valve 40 is closed as illustrated in FIG. 2 when the driving current is not supplied to the fuel injection valve 40. When the supply of the driving current is started in order to open the fuel injection valve 40, the electromagnetic force acting on the movable core 430 increases gradually. The movable core 430 starts moving upward when a resultant force of the upward force from the spring 492 and the electromagnetic force acting on the movable core 430 exceeds the downward force acting on the movable core 430 from the spring 491 via the valve body 420.

The upward movement of the movable core 430 pushes up the valve body 420 in contact with the upper surface 431 of the movable core 430. As a result, the lower end of the valve body 420 is separated from the valve seat 412 to allow fuel to be injected from the injection port 411.

The movable core 430 and the valve body 420 move further upward when the driving current is supplied to the fuel injection valve 40 after the start of the fuel injection. This causes a gradual increase in the opening of the fuel injection valve 40 and thus an increase in the flow rate of the fuel injected from the injection port 411 per unit time. The movable core 430 and the valve body 420 eventually reach the upper end of a movable range of the movable core and the valve body as illustrated in FIG. 3. That is, the movement of the movable core 430 involved in opening of the fuel injection valve 40 ends. In the following description, the operation of the fuel injection valve 40 performed at the time of transition from the closed state illustrated in FIG. 2 to the open state illustrated in FIG. 3 is referred to as a valve opening operation.

In the open state illustrated in FIG. 3, the upper surface 431 of the movable core 430 is in contact with the lower end surface 471 of the bushing 470. The opening of the fuel injection valve 40 is the widest in this state, so that the flow rate of the fuel injected from the injection port 411 per unit time is also the largest.

The electromagnetic force generated between the movable core 430 and the fixed core 460 disappears when the supply of the driving current to the fuel injection valve 40 is stopped. This causes the movable core 430 to move downward. The valve body 420 that has been pushed up by the movable core 430 also moves downward together with the movable core 430. As a result, the fuel injection valve 40 returns to the closed state illustrated in FIG. 2.

The injection control device 100 will now be described with reference to FIG. 4. A part or all of the injection control device 100 is configured as an analog circuit or a digital processor. In either case, a functional control block is configured in the injection control device 100 in order to fulfill the function of outputting a control signal on the basis of a received signal.

Figure 4:
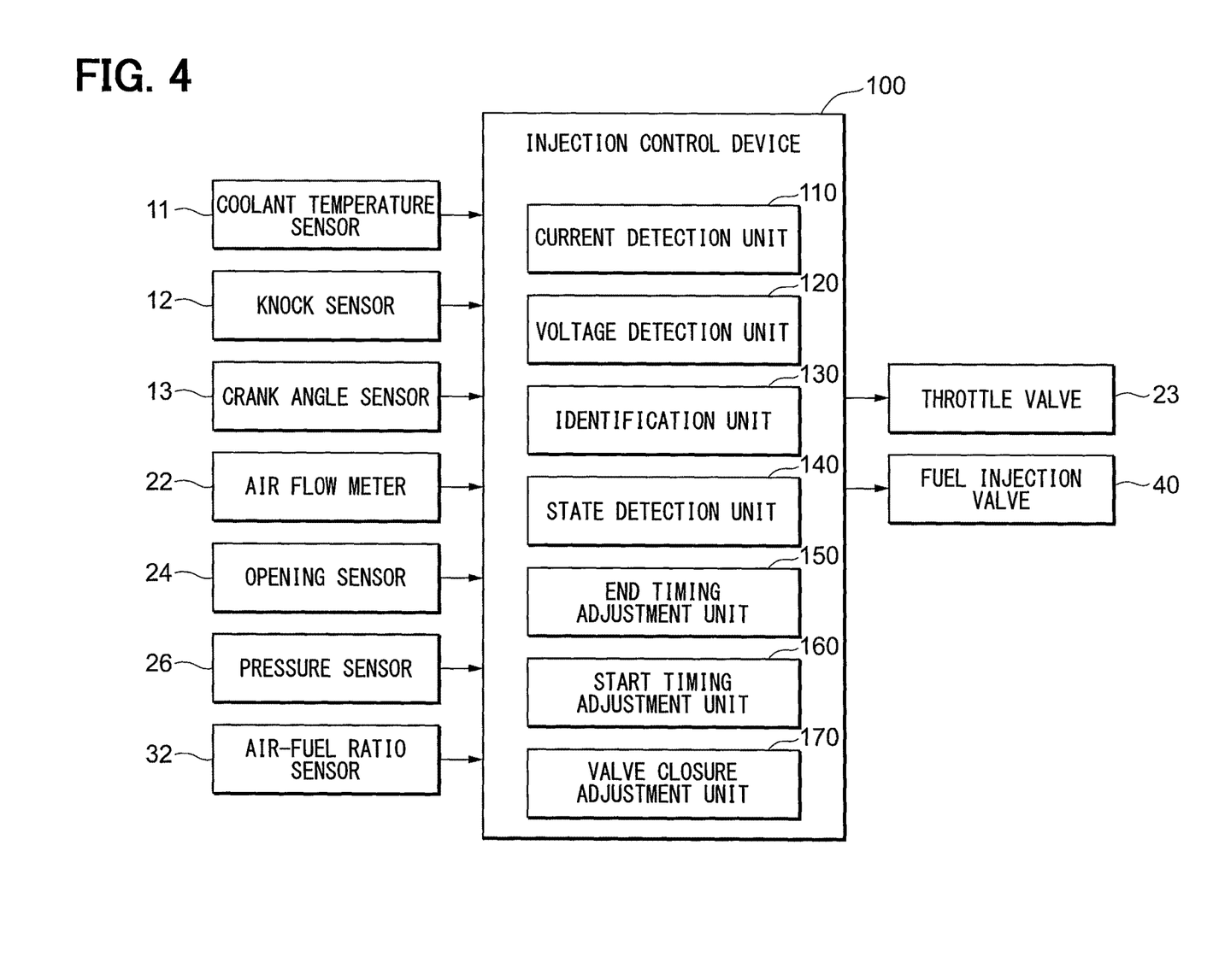
FIG. 4 is a functional block diagram illustrating the injection control device of FIG. 1.

FIG. 4 illustrates the injection control device 100 as a functional control block diagram. Note that the analog circuit constituting the injection control device 100 or a software module incorporated in the digital processor does not necessarily have to be divided like control blocks illustrated in FIG. 4. That is, an actual analog circuit or module may be configured to serve as a plurality of control blocks illustrated in FIG. 4 or may be further divided. An actual configuration inside the injection control device 100 can be modified as appropriate by a person skilled in the art as long as the injection control device is configured to be able to execute the following processing.

The injection control device 100 is electrically connected to the coolant temperature sensor 11, the knock sensor 12, the crank angle sensor 13, the air flow meter 22, the opening sensor 24, the pressure sensor 26, and the air-fuel ratio sensor 32. The injection control device 100 performs a predetermined calculation on the basis of a signal received from each of the coolant temperature sensor 11, the crank angle sensor 13, the air flow meter 22, the opening sensor 24, the pressure sensor 26, and the air-fuel ratio sensor 32, thereby acquiring each of the temperature of the coolant, the speed of the internal combustion engine 10, the flow rate of air supplied to the internal combustion engine 10, the opening of the throttle valve 23, the pressure of the air supplied to the internal combustion engine 10, and the air-fuel ratio in the internal combustion engine 10. The injection control device 100 also performs a predetermined calculation on the basis of a signal received from the knock sensor 12 and detects knocking that occurs inside the cylinder of the internal combustion engine 10.

The injection control device 100 is also electrically connected to the throttle valve 23 and the fuel injection valve 40. The injection control device 100 transmits control signals to the throttle valve 23 and the fuel injection valve 40 to control the operations of the valves.

Note that in the present disclosure, the term "electrically connected" is not limited to a mode in which a connection is established by a signal line but also implies a mode in which communication can be established wirelessly.

The injection control device 100 includes a current detection unit 110, a voltage detection unit 120, an identification unit 130, a state detection unit 140, an end timing adjustment unit 150, a start timing adjustment unit 160, and a valve closure adjustment unit 170.

The current detection unit 110 detects the driving current actually flowing through the fuel injection valve 40. The current detection unit 110 acquires the waveform of the driving current by detecting the driving current that changes with time.

The voltage detection unit 120 detects a voltage applied to the solenoid 450 in order to operate the fuel injection valve 40. In the following description, the voltage applied to operate the fuel injection valve 40 is referred to as a driving voltage. The voltage detection unit 120 acquires the waveform of the driving voltage by detecting the driving voltage that changes with time.

The identification unit 130 identifies a theoretical model of the driving current flowing through the fuel injection valve 40. The theoretical model is a model of the driving current in a state where the movable core 430 of the fuel injection valve 40 illustrated in FIGS. 2 and 3 is at rest. That is, the theoretical model does not take into consideration a change in impedance caused by the movement of the movable core 430.

The state detection unit 140 detects the state of the movable core 430 of the fuel injection valve 40. Specifically, the state detection unit 140 detects that the movement of the movable core 430 has started or ended in the valve opening operation of the fuel injection valve 40.

The end timing adjustment unit 150 adjusts a timing that the movement of the movable core 430 ends in the valve opening operation of the fuel injection valve 40. In the following description, the timing that the movement of the movable core 430 ends in the valve opening operation of the fuel injection valve 40 is also referred to as an end timing.

The start timing adjustment unit 160 adjusts a timing that the movement of the movable core 430 starts in the valve opening operation of the fuel injection valve 40. In the following description, the timing that the movement of the movable core 430 starts in the valve opening operation of the fuel injection valve 40 is also referred to as a start timing.

The valve closure adjustment unit 170 adjusts closing of the fuel injection valve 40. The valve closure adjustment unit 170 adjusts the amount of movement of the movable core 430 and the valve opening time of the fuel injection valve 40.

A change in the driving current supplied to the fuel injection valve 40 and the like will be described with reference to FIG. 5. FIG. 5(A) illustrates an example of the waveform of a driving pulse generated by the injection control device 100. The driving current is supplied (in other words, the driving voltage is applied) while the driving pulse is turned on. FIG. 5(A) shows an example that the driving pulse is turned on at time t11 and then turned off at time t15.

Figure 5:
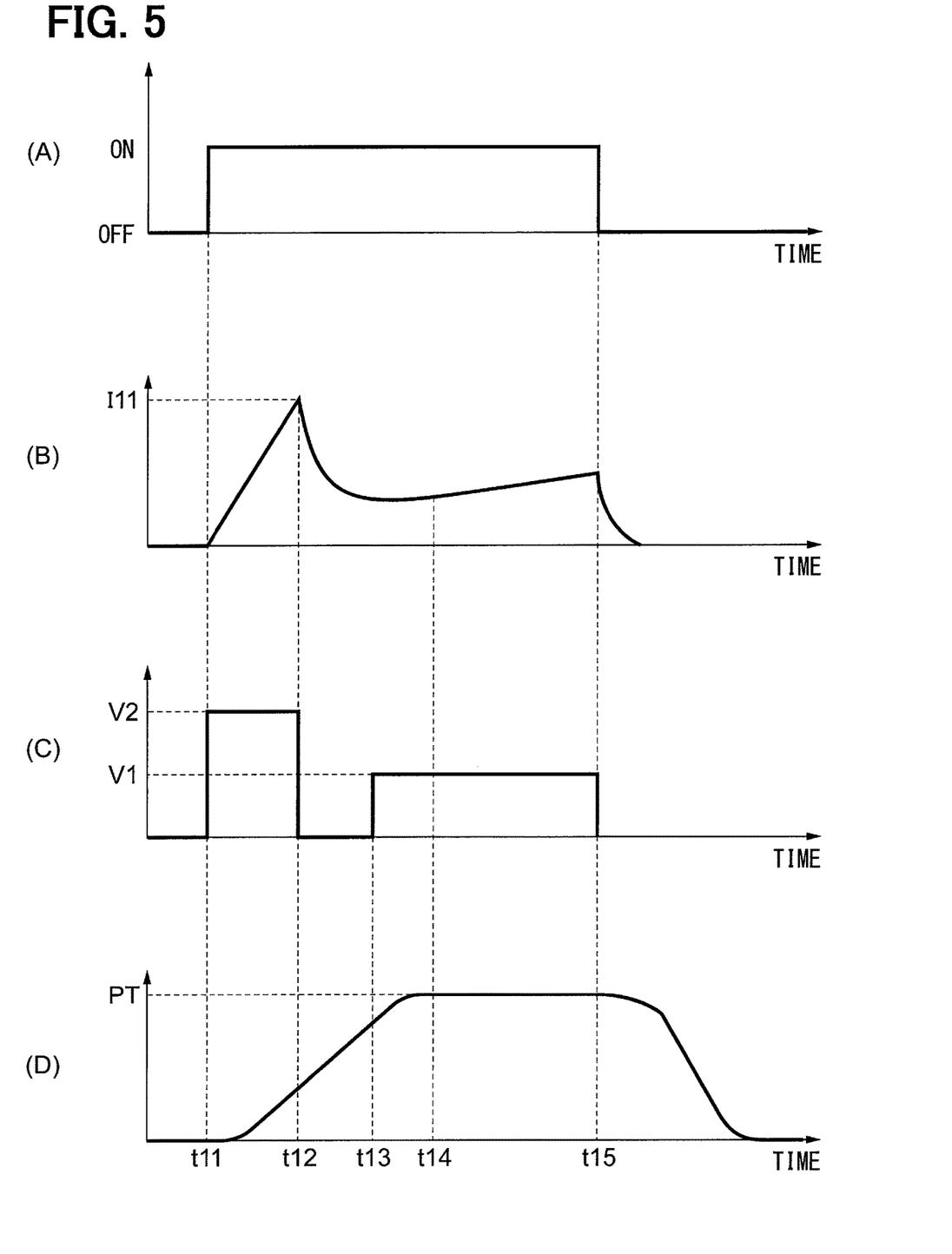

FIG. 5(B) illustrates a change in the driving current flowing through the solenoid 450 of the fuel injection valve 40. The driving current is detected by the current detection unit 110 of the injection control device 100 described above. FIG. 5(C) illustrates a change in the driving voltage that is applied to supply the driving current.

The vehicle GC includes a DC/DC converter (not shown) in addition to the aforementioned battery as a device that applies the driving voltage. As illustrated in FIG. 5(C), DC power output from the battery after time t11 is boosted by the DC/DC converter, whereby a high voltage V2 is applied to the fuel injection valve 40. As a result, the driving current rapidly increases after time t11 and reaches a maximum current value I11 being a target value at time t12, as illustrated in FIG. 5(B).

Once the driving current reaches the maximum current value I11, the boosting by the DC/DC converter is terminated so that the driving voltage drops to zero. As a result, the driving current rapidly decreases after time t12.

Note that the movable core 430 starts moving before time t12 and is also in upward motion after time t12. Inductance of the fuel injection valve 40 changes with the movement of the movable core 430 made of magnetic material. The driving current flowing through the solenoid 450 is affected by such change in inductance. Accordingly, a change in the driving current after time t12 varies in accordance with the movement of the movable core 430.

At time t13, the application of the driving voltage to the fuel injection valve 40 resumes. Note however that the voltage applied to the fuel injection valve 40 after time t13 is not boosted by the DC/DC converter. For this reason, the voltage applied after time t13 is a voltage V1 that is lower than the aforementioned voltage V2. Accordingly, the driving current flowing through the solenoid 450 after time t13 increases slowly.

FIG. 5(D) illustrates a change in the position of the movable core 430. Here, the graph represents the amount of movement of the movable core 430 upward from a reference position that is the position of the movable core 430 in the closed state illustrated in FIG. 2. As illustrated in FIG. 5(D), the movable core 430 starts moving after time t11 at which the application of the driving voltage is started. The movable core 430 keeps moving after time t12 at which the driving current reaches the maximum current value I11 and the application of the driving voltage boosted by the DC/DC converter is stopped. The movable core 430 then reaches a position PT at time t14. The movable core 430 is held at the position PT after time t14.

After time t15 at which the supply of the driving current is stopped, the force of attraction between the movable core 430 and the fixed core 460 decreases gradually and reaches zero eventually. As illustrated in FIG. 5(D), the movable core 430 starts moving downward in FIG. 2 at timing after time t15.

Note that in the example illustrated in FIG. 5, the period during which the driving pulse is turned on is sufficiently long so that the movable core 430 reaches the position PT. That is, the fuel injection valve 40 in the example operates under such operating conditions that the movable core 430 or the like moves to a position corresponding to the maximum opening of the fuel injection valve 40.

Detection of the movement of the movable core 430 in the valve opening operation of the fuel injection valve 40 will be described with reference to FIGS. 6 and 7. The injection control device 100 uses the state detection unit 140 described above and detects the movement of the movable core 430. The injection control device 100 detects the start timing and the end timing. As described above, the start timing is the timing at which the movement of the movable core 430 starts in the valve opening operation of the fuel injection valve 40. The end timing is the timing at which the movement of the movable core 430 ends in the valve opening operation of the fuel injection valve 40.

First, detection of the end timing will be described with reference to FIG. 6. FIG. 6(B) illustrates a part of the waveform of the driving current. FIG. 6(D) illustrates a part of a change in the position of the movable core 430.

The driving current flowing through the solenoid 450 increases slowly when the electric power output from the battery is supplied to the fuel injection valve 40 without being boosted by the DC/DC converter as described above. The identification unit 130 of the injection control device 100 described above identifies a theoretical model of the driving current increasing slowly. The theoretical model here is a model of a driving current I(t) in a state where the movable core 430 has finished moving in the valve opening operation of the fuel injection valve 40 and is at rest (or a state where the fuel injection valve 40 is open).

The driving current I(t) at this time is represented as Formula f1 by approximating a driving current supply circuit including the solenoid 450 by an RL series circuit. In Formula f1, VB represents a voltage of the battery, $R_{inj}$ represents a resistance value of the driving current supply circuit, $L_{inj}$ represents inductance of the solenoid, and $I_0$ represents an initial value of the driving current.

[Formula 1]

$$I(t) = \frac{VB}{R_{inj}} - \left(\frac{VB}{R_{inj}} - I_0\right) e^{-\frac{R_{inj}}{L_{inj}} t} \quad (f1)$$

Figure 6:
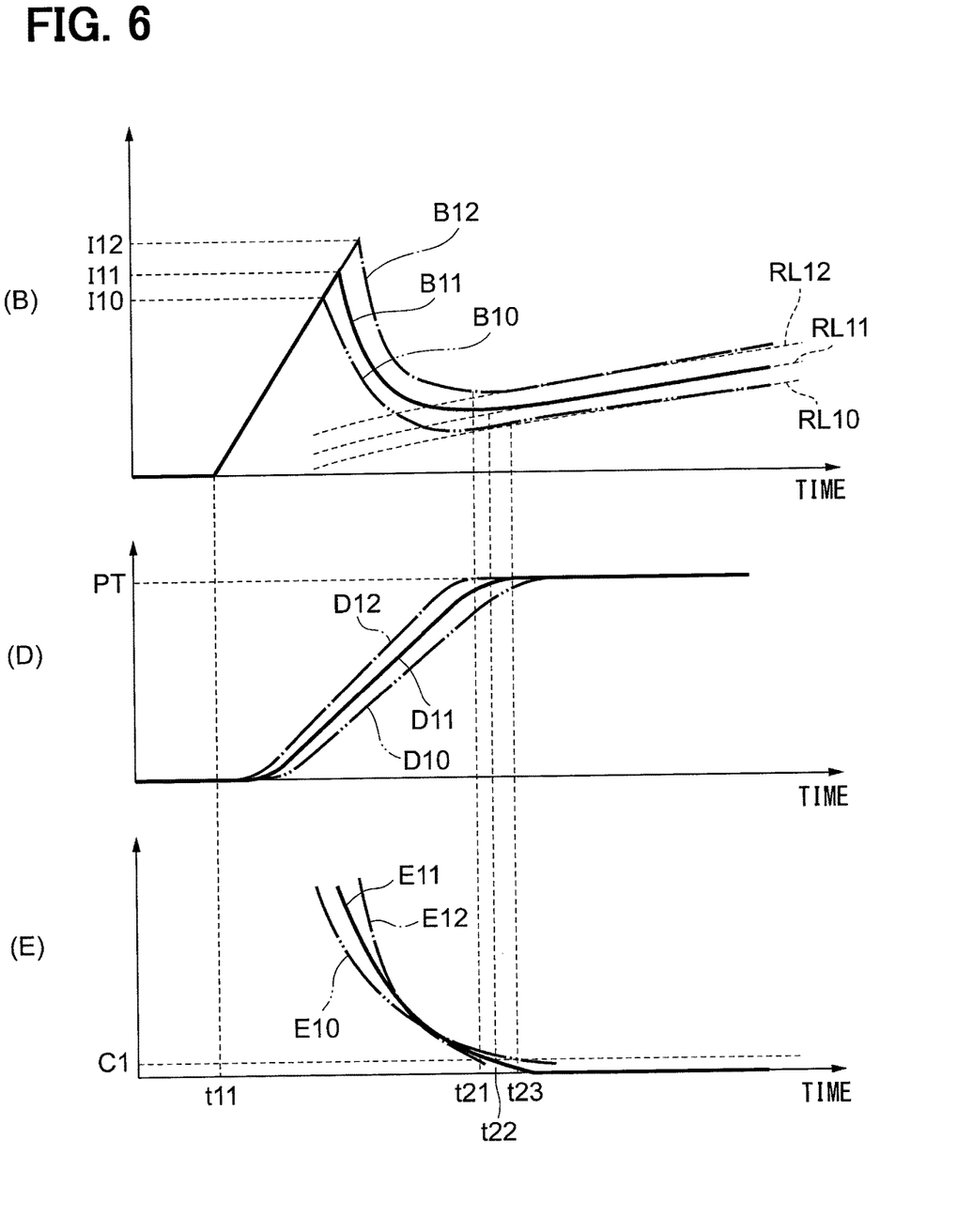
FIG. 6 is a graph illustrating timing of the end of a movement of a movable core in a valve opening operation.

Looking at a waveform B11 of the driving current illustrated in FIG. 6(B), the driving current decreases rapidly after reaching the maximum current value and thereafter increases slowly. The driving current is detected by the current detection unit 110 of the injection control device 100 described above. On the basis of Formula f1, the identification unit 130 identifies in advance a theoretical model RL11 for the part of the waveform B11 increasing slowly. With the change in the driving current, the movable core 430 moves as indicated by a position D11 in FIG. 6(D).

According to Formula f1, the value of the driving current I(t) varies in accordance with the value of the battery voltage VB and the resistance value $R_{inj}$. These values vary depending on the individual difference and deterioration of the battery as well as the temperature of the driving current supply circuit. The identification unit 130 thus corrects the value of the battery voltage VB and the resistance value $R_{inj}$ by using at least one of actual driving current values detected by the current detection unit 110. The actual driving current value used here is obtained after the end timing detected. The identification unit 130 performs such correction and identifies in advance the theoretical model from which the aforementioned variations are eliminated.

FIG. 6(E) illustrates a deviation E11 between the waveform B11 of the driving current and the theoretical model RL11 (that is, B11−RL11). The deviation E11 equals zero when the waveform B11 of the actual driving current matches the theoretical model RL11 of the driving current in a state where the movable core 430 is at rest. That is, when the deviation E11 equals zero, it can be estimated that the movable core 430 has finished moving in the valve opening operation of the fuel injection valve 40 and is at rest.

Considering the influence of noise generated in the driving current, the injection control device 100 of the present embodiment detects time t22, at which the deviation E11 is smaller than or equal to an end threshold C1, as the end timing. The end threshold C1 is set to a value close to zero, so that the movable core 430 can be regarded as having finished the movement at the end timing.

The internal combustion engine 10 is provided with the fuel injection valve 40 for each cylinder as described above, but the waveforms of the driving currents flowing through the solenoids 450 of the fuel injection valves 40 are not necessarily identical. That is, the waveforms of the driving currents flowing through the solenoids 450 of the fuel injection valves 40 may vary as indicated by the waveforms B10, B11, and B12 illustrated in FIG. 6(B) due to factors such as the driving current supply circuit, the individual difference and deterioration of the battery, and the like.

Looking at the waveform B10 of the driving current illustrated in FIG. 6(B), the driving current decreases rapidly after reaching a maximum current value I10 and thereafter increases slowly. The maximum current value I10 is smaller than the maximum current value I11 of the waveform B11. Accordingly, a theoretical model RL10 identified by the identification unit 130 for the part of the waveform B10 increasing slowly is smaller than the theoretical model RL11 described above. With the change in the driving current, the movable core 430 moves as indicated by a position D10 in FIG. 6(D).

As illustrated in FIG. 6(E), time t23 at which a deviation E10 between the waveform B10 of the driving current and the theoretical model RL10 (that is, B10−RL10) is smaller than or equal to the end threshold C1 is detected as the end timing by the injection control device 100. Therefore, the end timing of the movement when the driving current changes as indicated by the waveform B10 is later than when the driving current changes as indicated by the waveform B11.

Looking at the waveform B12 of the driving current illustrated in FIG. 6(B), the driving current decreases rapidly after reaching a maximum current value I12 and thereafter increases slowly. The maximum current value I12 is larger than the maximum current value I11 of the waveform B11. Accordingly, a theoretical model RL12 identified by the identification unit 130 for the part of the waveform B12 increasing slowly is larger than the theoretical model RL11 described above. With the change in the driving current, the movable core 430 moves as indicated by a position D12 in FIG. 6(D).

As illustrated in FIG. 6(E), time t21 at which a deviation E12 between the waveform B12 of the driving current and the theoretical model RL12 (that is, B12−RL12) is smaller than or equal to the end threshold C1 is detected as the end timing by the injection control device 100. Therefore, the end timing of the movement when the driving current changes as indicated by the waveform B12 is earlier than when the driving current changes as indicated by the waveform B11.

Such variations in the end timing can cause variations in the amount of fuel injected from the fuel injection valves 40 provided in the internal combustion engine 10. The internal combustion engine 10 may not operate properly as a result. The injection control device 100 thus adjusts the end timing for each fuel injection valve 40. The injection control device 100 performs the adjustment by using the end timing adjustment unit 150 described above.

When the driving current for one of the plurality of fuel injection valves 40 changes as indicated by the waveform B10, for example, the injection control device 100 causes the DC/DC converter to further boost the driving voltage. As a result, the injection control device 100 increases the driving voltage and increases the maximum current value of the driving current up to I11.

When the driving current for another one of the fuel injection valves 40 changes as indicated by the waveform B12, the injection control device 100 causes the DC/DC converter to reduce the boosting performed thereby. As a result, the injection control device 100 lowers the driving voltage and lowers the maximum current value of the driving current down to I11.

The injection control device 100 performs the aforementioned control to be able to match the waveforms of the driving currents for the two fuel injection valves 40 with the waveform B11 and adjust the end timing for each fuel injection valve to time t22. As a result, the variations in the amount of fuel injected from the fuel injection valves 40 can be reduced.

There has been illustrated the case where the injection control device 100 adjusts the end timing by adjusting both the driving current and the driving voltage. However, the end timing may be adjusted by another method as well. That is, only one of the driving current and the driving voltage may be adjusted as long as the end timing can be adjusted to reduce the variations in the amount of fuel injected from the fuel injection valves 40.

Next, detection of the start timing will be described with reference to FIG. 7. FIG. 7(B) illustrates a part of the waveform of the driving current. FIG. 7(D) illustrates a part of a change in the position of the movable core 430.

The driving current increases rapidly after time t11 when the electric power output from the battery is supplied to the fuel injection valve 40 upon being boosted by the DC/DC converter as described above. The identification unit 130 of the injection control device 100 described above identifies a theoretical model of the driving current increasing rapidly. The theoretical model here is a model of the driving current I(t) in a state where the movable core 430 has not started moving in the valve opening operation of the fuel injection valve 40 and is at rest (or a state where the fuel injection valve 40 is closed).

The driving current I(t) at this time is represented as Formula f2 by approximating the driving current supply circuit including the solenoid 450 by an RL series circuit. In Formula f2, $V_{boost}$ represents a voltage after being boosted by the DC/DC converter. Similar to Formula 1, $R_{inj}$ represents the resistance value of the driving current supply circuit, $L_{inj}$ represents the inductance of the solenoid, and $I_0$ represents the initial value of the driving current.

[Formula 2]

$$I(t) = \frac{V_{boost}}{R_{inj}}\left(1 - e^{-\frac{R_{inj}}{L_{inj}}t}\right) \quad (f2)$$

Figure 7:
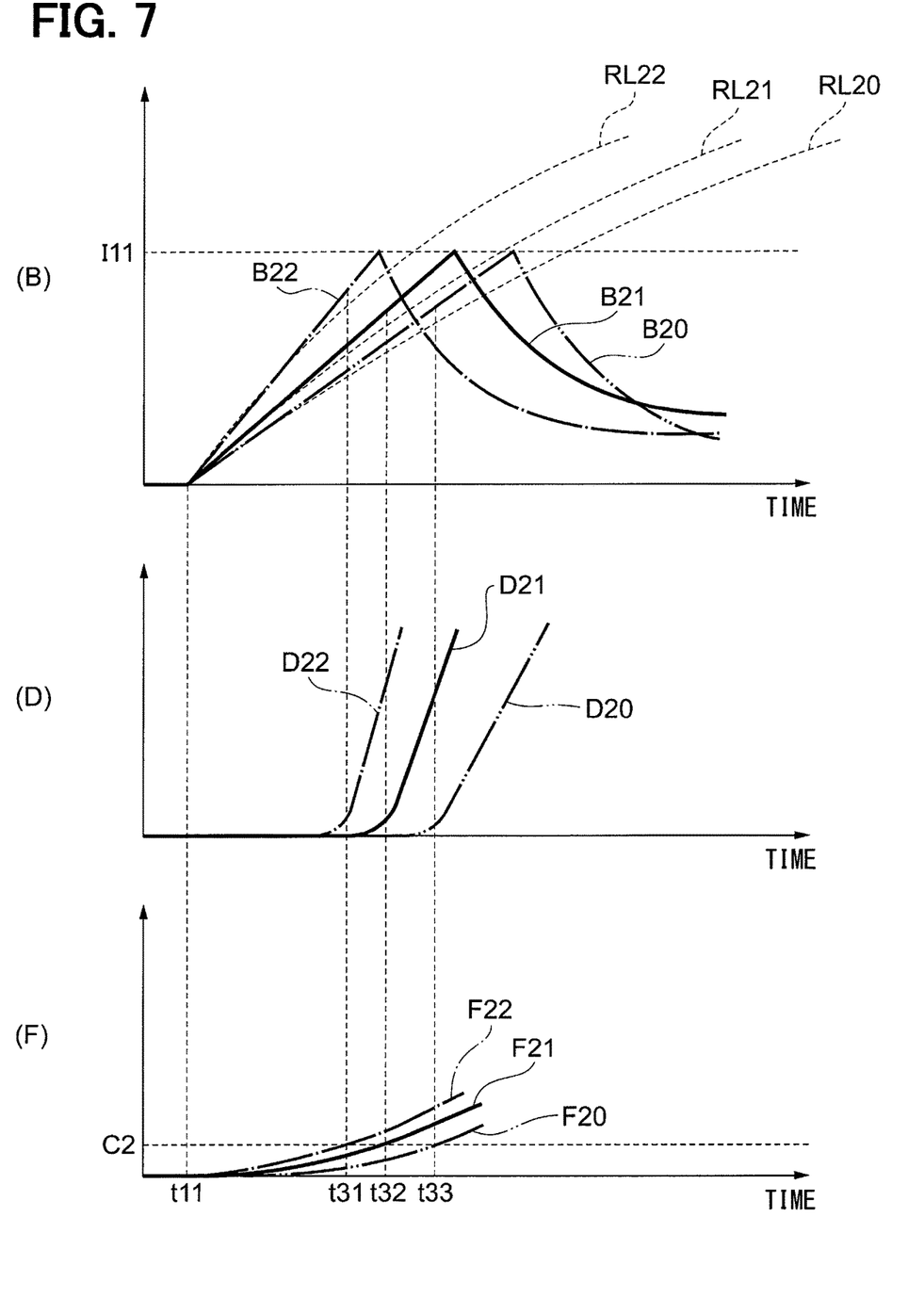
FIG. 7 is a graph illustrating timing of the start of the movement of the movable core in the valve opening operation.

Looking at a waveform B21 of the driving current illustrated in FIG. 7(B), the driving current increases rapidly until the current reaches the maximum current value I11. The driving current is detected by the current detection unit 110 of the injection control device 100 described above. On the basis of Formula f2, the identification unit 130 identifies in advance a theoretical model RL21 for the part of the waveform B21 increasing rapidly. With the change in the driving current, the movable core 430 moves as indicated by a position D21 illustrated in FIG. 7(D).

According to Formula f2, the value of the driving current I(t) varies in accordance with the value of a characteristic of the DC/DC converter and the resistance value $R_{inj}$. These values vary depending on deterioration of the DC/DC converter and the temperature of the driving current supply circuit. The identification unit 130 thus corrects the battery voltage $V_{boost}$ and the resistance value $R_{inj}$ by using at least one of actual driving current values detected by the current detection unit 110. The actual driving current value used here is obtained before the start timing detected. The identification unit 130 performs such correction and identifies in advance the theoretical model from which the aforementioned variations are eliminated.

FIG. 7(F) illustrates a deviation F21 between the waveform B21 of the driving current and the theoretical model RL21 (that is, B21−RL21). The deviation F21 equals zero when the waveform B21 of the actual driving current matches the theoretical model RL21 of the driving current in a state where the movable core 430 is at rest. That is, when the deviation F21 is greater than zero, it can be estimated that the movable core 430 having been at rest has started moving in the valve opening operation of the fuel injection valve 40.

Considering the influence of noise generated in the driving current, the injection control device 100 of the present embodiment detects time t32, at which the deviation F21 is greater than or equal to a start threshold C2, as the start timing. The start threshold C2 is set to a value close to zero, so that the movable core 430 can be regarded as having started the movement at the start timing.

The internal combustion engine 10 is provided with the fuel injection valve 40 for each cylinder as described above, but the waveforms of the driving currents flowing through the solenoids 450 of the fuel injection valves 40 are not necessarily identical. That is, the waveforms of the driving currents flowing through the solenoids 450 of the fuel injection valves 40 may vary as indicated by the waveforms B20, B21, and B22 illustrated in FIG. 7(B) due to factors such as the driving current supply circuit, the individual difference and deterioration of the battery, and the like.

Looking at the waveform B20 of the driving current illustrated in FIG. 7(B), the driving current reaches the maximum current value I11 more slowly than the case of the waveform B21. Accordingly, a theoretical model RL20 identified by the identification unit 130 for the part of the waveform B20 before reaching the maximum current value I11 is smaller than the theoretical model RL21 described above. With the change in the driving current, the movable core 430 moves as indicated by a position F20 illustrated in FIG. 7(F).

As illustrated in FIG. 7(F), time t33 at which a deviation F20 between the waveform B20 of the driving current and the theoretical model RL20 (that is, B20−RL20) is greater than or equal to the start threshold C2 is detected as the start timing by the injection control device 100. Therefore, the start timing of the movement when the driving current changes as indicated by the waveform B20 is later than when the driving current changes as indicated by the waveform B21.

Looking at the waveform B22 of the driving current illustrated in FIG. 7(B), the driving current reaches the maximum current value I11 more rapidly than the case of the waveform B21. Accordingly, a theoretical model RL22 identified by the identification unit 130 for the part of the waveform B22 before reaching the maximum current value I11 is greater than the theoretical model RL21 described above. With the change in the driving current, the movable core 430 moves as indicated by a position D22 illustrated in FIG. 7(D).

As illustrated in FIG. 7(F), time t31 at which a deviation F22 between the waveform B22 of the driving current and the theoretical model RL22 (that is, B22−RL22) is greater than or equal to the start threshold C2 is detected as the start timing by the injection control device 100. Therefore, the start timing of the movement when the driving current changes as indicated by the waveform B22 is earlier than when the driving current changes as indicated by the waveform B21.

Such variations in the start timing can cause variations in the amount of fuel injected from the fuel injection valves 40 provided in the internal combustion engine 10. The internal combustion engine 10 may not operate properly as a result. The injection control device 100 thus adjusts the start timing for each fuel injection valve 40. The injection control device 100 performs the adjustment by using the start timing adjustment unit 160 described above.

When the driving current for one of the plurality of fuel injection valves 40 changes as indicated by the waveform B20, for example, the injection control device 100 causes the DC/DC converter to further boost the driving voltage. As a result, the injection control device 100 increases the driving voltage and adjusts the driving current such that the driving current reaches the maximum current value I11 more quickly.

When the driving current for another one of the fuel injection valves 40 changes as indicated by the waveform B22, the injection control device 100 causes the DC/DC converter to reduce the boosting performed thereby. As a result, the injection control device 100 lowers the driving voltage and adjusts the driving current such that the current reaches the maximum current value I11 more slowly.

The injection control device 100 performs the aforementioned control to be able to match the waveforms of the driving currents for the two fuel injection valves 40 with the waveform B21 and adjust the end timing for each fuel injection valve to time t32. As a result, the variations in the amount of fuel injected from the fuel injection valves 40 can be reduced.

There has been illustrated the case where the injection control device 100 adjusts the start timing by adjusting both the driving current and the driving voltage. However, the start timing may be adjusted by another method as well. That is, only one of the driving current and the driving voltage may be adjusted as long as the start timing can be adjusted to reduce the variations in the amount of fuel injected from the fuel injection valves 40.

An adjustment made in closing the fuel injection valve will be described with reference to FIG. 8. FIG. 8(A) illustrates the waveform of a driving pulse generated by the injection control device 100. The waveform of the driving pulse illustrated FIG. 8(A) is generated by the injection control device 100 under the operating condition (a so-called partial lift condition) in which the movable core 430 does not reach the uppermost position illustrated in FIG. 3. FIG. 8(D) illustrates a change in the position of the movable core 430.

When the start timing and the end timing vary among the fuel injection valves 40, each of these timings is adjusted to be able to reduce the variations in the amount of fuel injected as described above. The injection control device 100 changes the width of the driving pulse in order to further reduce the variations.

Figure 8:
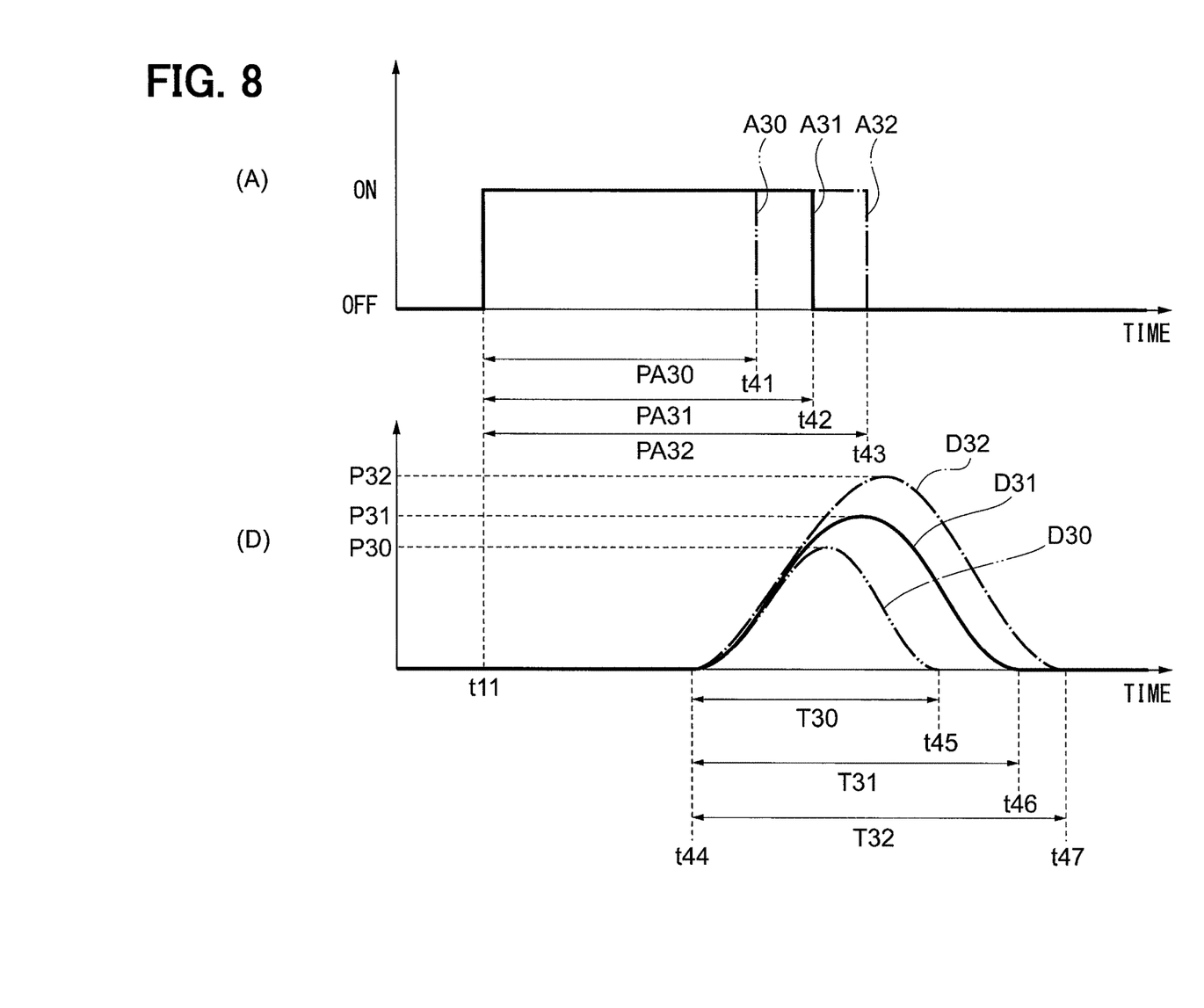
FIG. 8 is a graph illustrating an adjustment performed in closing the fuel injection valve.

Looking at a waveform A31 of the driving pulse illustrated in FIG. 8, the injection control device 100 generates the driving pulse with a width PA31 from time t11 to time t42. At this time, the movable core 430 moves as indicated by a position D31 illustrated in FIG. 8(D). The movable core 430 moves until the amount of movement thereof reaches P31 at the maximum. In addition, the fuel injection valve 40 injects fuel for a period T31 from time t44 to time t46. That is, time t46 corresponds to the timing at which the fuel injection valve 40 is closed.

Looking at a waveform A30 of the driving pulse illustrated in FIG. 8, the injection control device 100 generates the driving pulse with a width PA30 from time t11 to time t41. At this time, the movable core 430 moves as indicated by a position D30 illustrated in FIG. 8(D). The movable core 430 moves until the amount of movement thereof reaches P30 at the maximum. In addition, the fuel injection valve 40 injects fuel for a period T30 from time t44 to time t45. That is, time t45 corresponds to the timing at which the fuel injection valve 40 is closed. The period T30 is shorter than the period T31 for the case of the waveform A31. The amount of fuel injected during the period T30 is therefore smaller than the amount of fuel injected during the period T31.

Looking at a waveform A32 of the driving pulse illustrated in FIG. 8, the injection control device 100 generates the driving pulse with a width PA32 from time t11 to time t43. At this time, the movable core 430 moves as indicated by a position D32 illustrated in FIG. 8(D). The movable core 430 moves until the amount of movement thereof reaches P32 at the maximum. In addition, the fuel injection valve 40 injects fuel for a period T32 from time t44 to time t47. That is, time t47 corresponds to the timing at which the fuel injection valve 40 is closed. The period T32 is longer than the period T31 for the case of the waveform A31. The amount of fuel injected during the period T32 is therefore larger than the amount of fuel injected during the period T31.

The injection control device 100 adjusts the start timing and end timing being detected as well as changes the width of the driving pulse for the fuel injection valve 40 exhibiting the aforementioned characteristic. That is, the injection control device 100 increases the width of the driving pulse for the fuel injection valve 40 injecting an insufficient amount of fuel, or decreases the width of the driving pulse for the fuel injection valve 40 injecting an excessive amount of fuel. As a result, the variations in the amount of fuel injected from the fuel injection valves 40 of the internal combustion engine 10 can be further reduced under the partial lift condition.

According to the injection control device 100 described above, the state of the movable core 430 is detected on the basis of the deviation between the actual driving current detected by the current detection unit 110 and the theoretical model. The injection control device can thus be less susceptible to noise generated in the driving current as compared with the case where the state of the movable core 430 is detected on the basis of the value obtained by differentiating the driving current with respect to time. The injection control device 100 can also detect the state of the movable core 430 accurately even when the injection control device is applied to the fuel injection valve with a small change in inductance.

The state detection unit 140 detects that the movement of the movable core 430 has started in the valve opening operation of the fuel injection valve 40 on the basis of the fact that the deviation between the actual driving current and the theoretical model is smaller than or equal to the predetermined end threshold C1. The theoretical model is a model of the driving current in a state where the movable core 430 is at rest. It can be reliably detected that the movement of the movable core 430 has ended on the basis of the actual driving current that changes with the movement of the movable core 430.

The identification unit 130 identifies the theoretical model on the basis of the driving current detected by the current detection unit after the movement of the movable core 430 ends in the valve opening operation of the fuel injection valve 40. Accordingly, a more appropriate theoretical model can be identified by eliminating the influence of the individual difference and deterioration of the battery, the temperature of the driving current supply circuit, and the like. As a result, it can be further reliably detected that the movement of the movable core 430 has ended.

The injection control device 100 includes the end timing adjustment unit 150 that adjusts the end timing that is the timing for ending the movement of the movable core 430 in the valve opening operation of the plurality of fuel injection valves 40. The end timing adjustment unit 150 adjusts the end timing so as to reduce the variations in the amount of fuel injected from the plurality of fuel injection valves 40. The variations in the amount of fuel injected from the fuel injection valves 40 are thus reduced so that the internal combustion engine 10 can operate properly.

Moreover, the end timing adjustment unit 150 adjusts the end timing by adjusting at least one of the driving current and the voltage applied to the solenoid 450. The end timing can thus be adjusted without requiring a complicated device or control.

The state detection unit 140 detects the start of the movement of the movable core 430 in the valve opening operation of the fuel injection valve 40 on the basis of the fact that the deviation between the driving current and the theoretical model is greater than or equal to the predetermined start threshold C2. The theoretical model is a model of the driving current in a state where the movable core 430 is at rest. The start of the movement of the movable core 430 can thus be detected reliably on the basis of the actual driving current that changes with the movement of the movable core 430.

The identification unit 130 identifies the theoretical model on the basis of the driving current detected by the current detection unit 110 before the movement of the movable core 430 starts in the valve opening operation of the fuel injection valve 40. Accordingly, a more appropriate theoretical model can be identified by eliminating the influence of the individual difference and deterioration of the battery, the temperature of the driving current supply circuit, and the like. As a result, it can be reliably detected that the movement of the movable core 430 has ended.

The injection control device 100 includes the start timing adjustment unit 160 that adjusts the start timing that is the timing for starting the movement of the movable core 430 in the valve opening operation of the plurality of fuel injection valves 40. The start timing adjustment unit 160 adjusts the start timing so as to reduce the variations in the amount of fuel injected from the plurality of fuel injection valves 40. The variations in the amount of fuel injected from the fuel injection valves 40 are thus reduced further so that the internal combustion engine 10 can operate properly.

Moreover, the start timing adjustment unit 160 adjusts the start timing by adjusting at least one of the driving current and the voltage applied to the solenoid 450. The start timing can thus be adjusted without requiring a complicated device or control.

The injection control device 100 includes the valve closure adjustment unit 170 that reduces the variations in the amount of fuel injected from the plurality of fuel injection valves 40 by adjusting closing of the plurality of fuel injection valves 40. In addition to the start timing and the end timing, closing of the fuel injection valves 40 is also adjusted so that the variations in the amount of fuel injected from the fuel injection valves 40 can be further reduced.

The valve closure adjustment unit 170 also adjusts the timing of closing the plurality of fuel injection valves 40 by adjusting the maximum value of the amount of movement of the movable core 430 in the valve opening operation of the plurality of fuel injection valves 40. The timing of closing the plurality of fuel injection valves 40 can thus be adjusted without requiring a complicated device or control.

The valve closure adjustment unit 170 also adjusts the timing of closing the plurality of fuel injection valves 40 by changing the width of the driving pulse supplied to the fuel injection valve 40. The timing of closing the plurality of fuel injection valves 40 can thus be adjusted without requiring a complicated device or control.

The identification unit 130 identifies the theoretical model by approximating the circuit supplying the driving current to the solenoid 450 with the RL series circuit. It is therefore possible to easily and accurately identify the theoretical model used to detect the state of the movable core.

The embodiment of the present disclosure has been described with reference to specific examples. However, the present disclosure is not limited to these specific examples. That is, ones obtained by modifying the design of these specific examples as appropriate by a person skilled in the art are also included in the scope of the present disclosure as long as they have the characteristics of the present disclosure. The elements and their arrangements, materials, conditions, shapes, sizes, and the like included in the specific examples described above are not limited to those exemplified but can be modified as appropriate.

The invention claimed is:
1. An injection control system, comprising:
 a fuel injection valve configured for use in an internal combustion engine; and
 an injection control device operatively coupled to the fuel injection valve and having processing circuitry configured to:
  detect a driving current supplied to a solenoid of the fuel injection valve;
  identify a theoretical model of a waveform of the driving current based on a formula in a state where a movable core moved by an electromagnetic force generated by the solenoid is at rest; and detect a state of the movable core, wherein the state of the movable core is detected based on a deviation between the detected driving current and the theoretical model.

2. An injection control device configured to control a fuel injection valve driven by an electric power, the injection control device comprising:

a current detection unit configured to detect a driving current supplied to a solenoid of the fuel injection valve;

an identification unit configured to identify a theoretical model of a waveform of the driving current based on a formula in a state where a movable core moved by an electromagnetic force generated by the solenoid is at rest; and a state detection unit configured to detect a state of the movable core, wherein the state detection unit detects the state of the movable core, based on a deviation between the detected driving current and the theoretical model.

3. The injection control device of claim 2, wherein the state detection unit detects that a movement of the movable core has started in a valve opening operation of the fuel injection valve, based on the deviation being greater than or equal to a predetermined start threshold during the deviation monotonically increasing.

4. The injection control device of claim 2, wherein the formula is defined by at least:

a voltage of a battery or a voltage after being boosted by a boosting circuit;

a resistance value of a driving current supply circuit for supplying the driving current;

an inductance of the solenoid; and an initial value of the driving current.

5. The injection control device of claim 4, wherein the formula is defined by approximating the driving current supply circuit, which includes the solenoid, by an RL series circuit.

6. The injection control device of claim 2, wherein the state detection unit detects that a movement of the movable core has started in a valve opening operation of the fuel injection valve, based the deviation being greater than or equal to a predetermined start threshold.

7. The injection control device of claim 6, wherein the identification unit identifies the theoretical model, based on the detected driving current before the movement of the movable core starts in the valve opening operation of the fuel injection valve.

8. The injection control device of claim 6, further comprising:

a start timing adjustment unit configured to adjust a start timing that is a timing that the movement of the movable core starts in the valve opening operation of a plurality of the fuel injection valves, wherein the start timing adjustment unit adjusts the start timing to reduce variations in the amount of fuel injected from the plurality of the fuel injection valves.

9. The injection control device of claim 8, wherein the start timing adjustment unit adjusts the start timing by adjusting at least one of the driving current and a voltage applied to the solenoid.

10. The injection control device of claim 2, wherein the state detection unit detects that a movement of the movable core has ended in a valve opening operation of the fuel injection valve, based on the deviation becoming smaller than or equal to a predetermined end threshold during the deviation monotonically decreasing.

11. The injection control device of claim 2, wherein the state detection unit detects that a movement of the movable core has ended in a valve opening operation of the fuel injection valve, based on the deviation being smaller than or equal to a predetermined end threshold.

12. The injection control device of claim 11, wherein the identification unit identifies the theoretical model, based on the detected driving current after the movement of the movable core ends in the valve opening operation of the fuel injection valve.

13. The injection control device of claim 11, further comprising:

an end timing adjustment unit configured to adjust an end timing that is a timing that the movement of the movable core ends in the valve opening operation of a plurality of the fuel injection valves, wherein the end timing adjustment unit adjusts the end timing to reduce variations in the amount of fuel injected from the plurality of the fuel injection valves.

14. The injection control device of claim 13, wherein the end timing adjustment unit adjusts the end timing by adjusting at least one of the driving current and a voltage applied to the solenoid.

15. The injection control device of claim 13, further comprising:

a valve closure adjustment unit configured to reduce the variations in the amount of fuel injected from the plurality of the fuel injection valves by adjusting closing of the plurality of the fuel injection valves.

16. The injection control device of claim 15, wherein the valve closure adjustment unit adjusts timing of closing the plurality of the fuel injection valves by adjusting a maximum value of the amount of movement of the movable core in the valve opening operation of the plurality of the fuel injection valves.

17. The injection control device of claim 15, wherein the valve closure adjustment unit adjusts timing of closing the plurality of the fuel injection valves by changing widths of driving pulses supplied to the fuel injection valves.

18. The injection control device of claim 12, wherein the identification unit identifies the theoretical model by approximating a circuit supplying the driving current to the solenoid with an RL series circuit.

* * * * *